Feb. 19, 1957  C. E. BROCKNER  2,782,412
GATED VIDEO INTEGRATOR RADAR SYSTEM
Filed May 13, 1952  3 Sheets-Sheet 1
*Fig.1.*
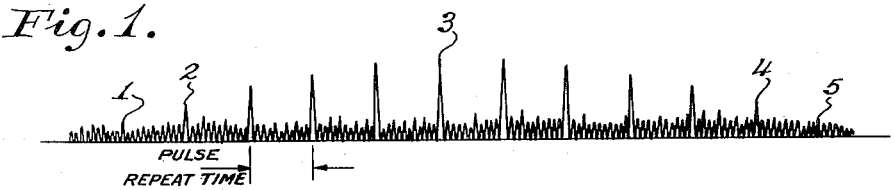
*Fig.2.*
*Fig.3.*
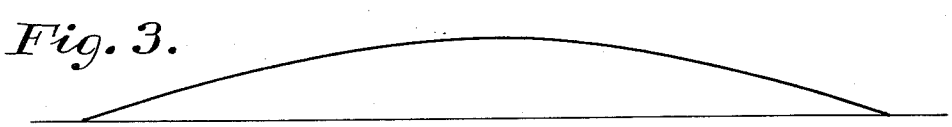
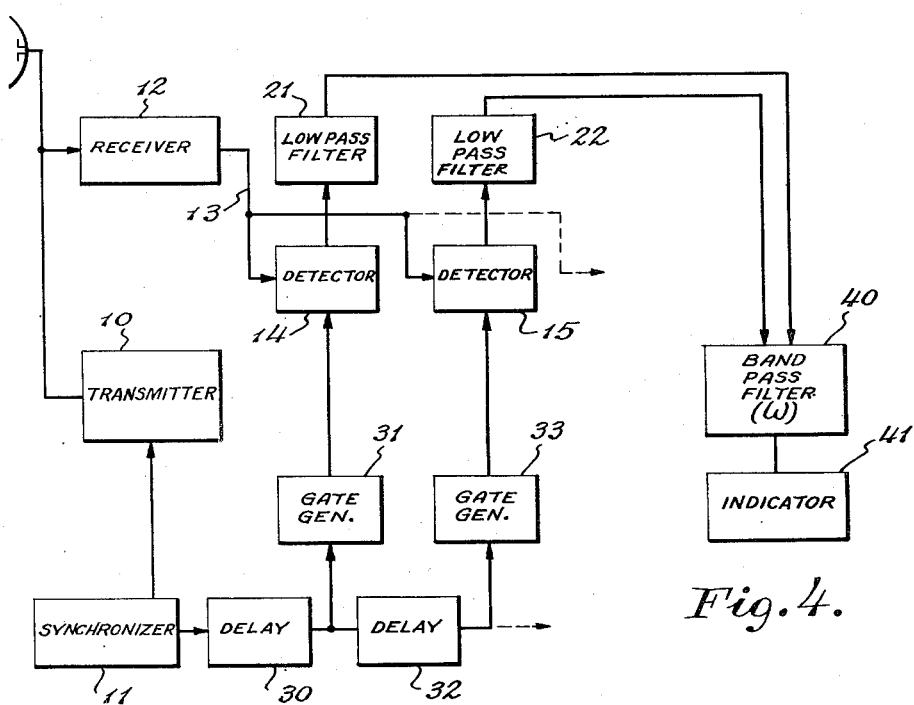
*Fig.4.*
INVENTOR
CHARLES E. BROCKNER
BY James P. Malone
ATTORNEY

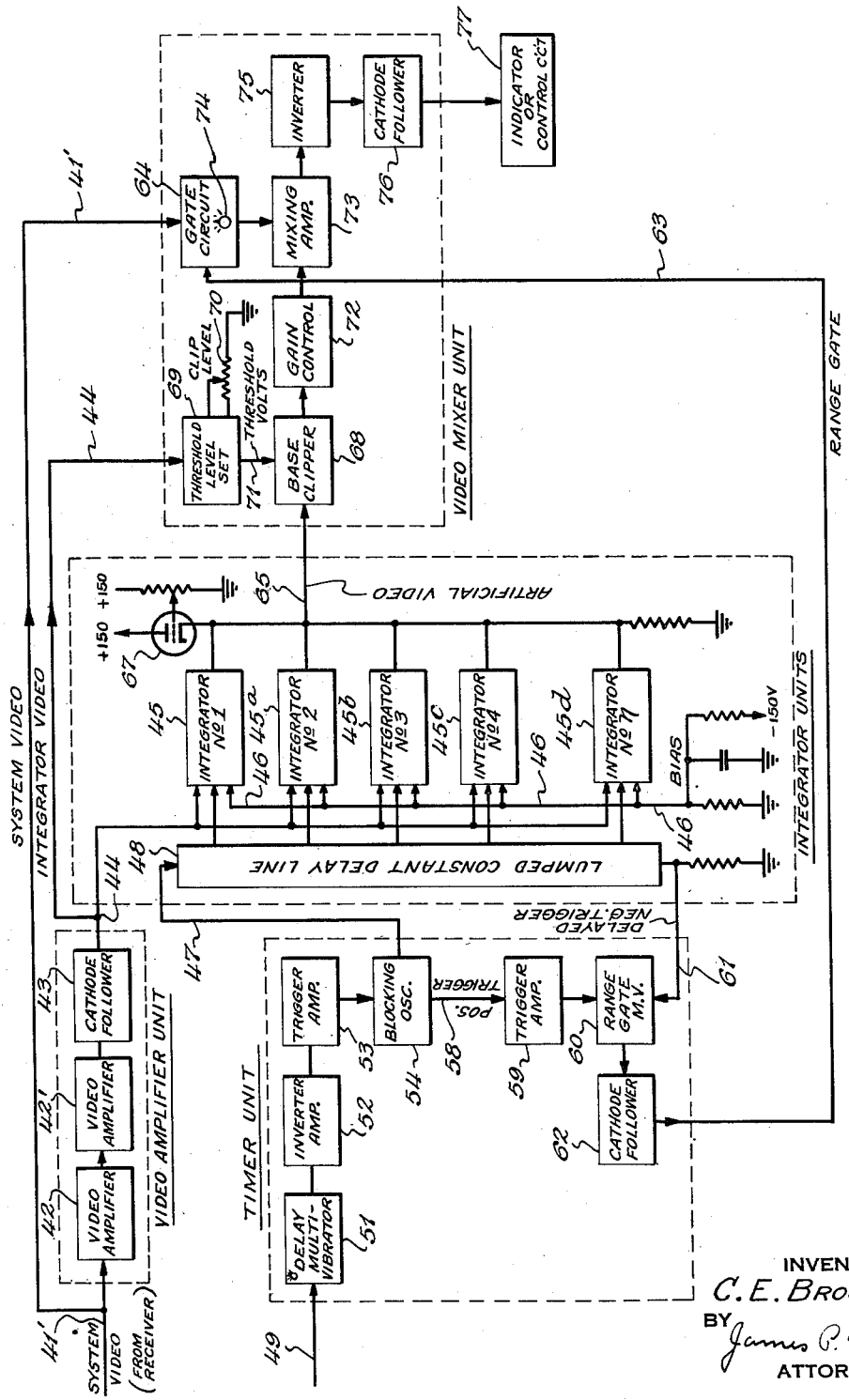

United States Patent Office 2,782,412
Patented Feb. 19, 1957

2,782,412

GATED VIDEO INTEGRATOR RADAR SYSTEM

Charles E. Brockner, Amityville, N. Y., assignor to Sperry Rand Corporation, a corporation of Delaware Application May 13, 1952, Serial No. 287,473

14 Claims. (Cl. 343—13)

The present invention relates to radar systems and more particularly to means for improving signal-to-noise ratio and hence the detection range of such systems. Specifically the invention relates to a gated video integration system. The technique employed also permits conservation of the range and angular information.

In pulsed radar systems there is a certain amount of inherent integration. This is because echoes are regularly received and noise is random. The A-type radar presentation inherently has this type integration when the antenna is not scanning, due to the storage property of the cathode ray screen. However, when the antenna is scanning, echoes received from a certain target are amplitude modulated at a frequency proportional to the scanning rate. This frequency may be determined when the scanning speed and antenna beam width are known. The present invention detects this modulation as the integrated value of target reflections in a certain sector equal to a beam width, as will be discussed. Since this modulation may be filtered with a selective band pass filter, a great increase of signal-to-noise ratio is obtained. The system also has means for gating in range to provide integration with respect to range, whereby the present invention provides integration of particular areas, i. e., both range and angular increments.

It is known that the range resolution of a radar is related to the pulse length, being approximately equal to the pulse length. That is to say, if two radar targets are closer than approximately 160 T yards (where T=pulse length in microseconds), the two targets would appear as one on the radar scope. If one desired to quantize the range coordinate of the radar return without loss of range resolution it would therefore be sufficient to make each interval or quantrum approximately equal to the pulse length in time or 160 T yards in range.

In order to effect this quantization in range a series of detectors are provided each of which samples the return in a small interval of time and stores this voltage until a new sample is taken. Each detector is gated on for approximately a pulse length and the spacing of the successive gates may be either contiguous or partially overlapping.

It is also known that the angular resolution of a radar is related to the radar beamwidth—being approximately equal to the beamwidth. This is to say, if two targets are closer to each other than a beamwidth apart, as viewed by the radar, the two targets would appear as one on the radar scope. It is therefore sufficient to record angle data at a rate approximately equal to the number of beamwidths scanned per unit time in order to assure that no loss in angular resolution is suffered.

This angular data is obtained in the present invention by placing a low-pass filter at the output of each detector mentioned above. These filters should have effective time constants approximately equal to the time required for the radar to scan one beamwidth. The action of each filter, at any given instant, is to have stored in its output, i. e., integrate, a summation of the radar returns and noise which occurred, at the range corresponding to the range gate of the particular gated detector, during the time required to scan one beamwidth. Therefore, signals from a particular area are integrated.

The signal-to-noise ratio at the output of the filter is therefore improved over that which obtains at the input of the filter through the summing or integration action of the filter. This is possible because use is being made of the apriori knowledge that the return from a target persists for time corresponding to that required for the radar to scan approximately a beamwidth whereas the occurrence of noise is a random time function. This difference between a target return and receiver noise results in different frequency distributions existing for the two phenomena and permits enhancement of the signal relative to receiver noise via integration in the low pass filter.

In order to obtain a video pulse signal proportional to the filtered output of each gated detector, the range gate which triggers each detector is also superimposed on the output of its respective filter to provide an artificial video signal proportional to the filtered output which may be applied to a suitable indicator.

Accordingly, a principal object of the invention is to provide new and improved means for increasing the signal-to-noise ratio of a radar system.

Another object of the present invention is to provide an increase in signal-to-noise ratio without destroying the range resolution and angular resolution of the radar system.

Another object of the present invention is to provide new and improved radar integrating means.

Another object of the present invention is to provide means for integrating target signals received from certain predetermined ranges.

Another object of the present invention is to provide means for integrating signals received from certain predetermined angles.

Another object of the present invention is to provide means to integrate signals received from certain predetermined areas.

Another object of the present invention is to provide new and improved gated video integrating means for a radar system.

These and other objects of the invention will be apparent from the following specification and drawings, of which, Figs. 1, 2, and 3 are wave forms illustrative of the principles of the invention;

Fig. 4 is a block diagram of an embodiment of the invention;

Fig. 5 is a block diagram of another embodiment of the invention;

Fig. 6b is a schematic diagram of the integrator of Fig. 6a.

Figure 6A:
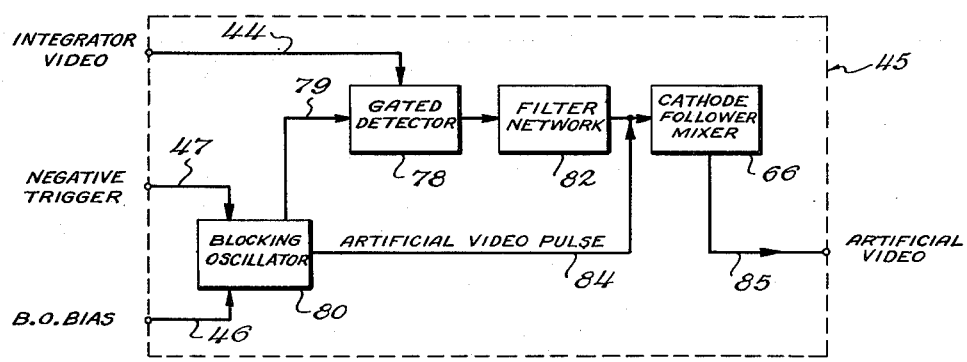
Fig. 6a is a block diagram of an integrator adapted to be used in the invention.

Fig. 1 illustrates reflections received from a target as the antenna beam scans the target. It will be seen that the amplitude of the echoes increases from a small value, for instance 1 and 2, to a maximum value as 3 and then down to small values 4 and 5. The reciprocal of the interval between pulses is the pulse repetition rate.

If the waveform of Fig. 1 is detected in a gated peak voltage responsive detector, of the type which stores a voltage equal to the peak value detected, then the waveform of Fig. 2 will be obtained.

Fig. 3 is the waveform obtained when the voltage of Fig. 2 is passed through a low pass filter. There will be some phase shift (not shown) due to the filter circuits but this does not affect system operation. The waveform of Fig. 3 may be approximated by the expression $\cos \omega t$ where $\omega$ is proportional to the scanning speed of the antenna and inversely proportional to the beamwidth. The frequency $\omega$ may be found as follows, assuming:

Bandwidth (BW)=2°
Antenna scan speed—360°/sec.

The time for the beam to scan a target is:

$$\text{Time} = \frac{BW}{\text{scan speed}} = \frac{2°}{360°/\text{sec.}} = \frac{1}{180} \text{sec.}$$

The time is equal to the half period of the frequency $\omega$ where $P=$ the period.

$$P = \text{the period.}$$

$$\frac{P}{2} = \frac{1}{180} \text{sec.}$$

$$P = \frac{1}{90} \text{sec.}$$

$$\frac{\omega}{2\pi} = 90 \text{ cycle/sec.}$$

Therefore, $$\frac{P}{2} = \frac{BW \text{ (degrees)}}{\text{scan speed (degrees/sec.)}}$$

$$P = \frac{2BW}{\text{scan speed}}$$

or $$\frac{\omega}{2\pi} = \frac{\text{scan speed (degrees/sec.)}}{2BW°}$$

The pulse repetition rate must be sufficient to produce a sufficient number of echoes per target within the time interval required to scan one beamwidth.

The waveform of Figs. 1, 2, and 3 are somewhat idealized. More specific waveforms for the integrators are given in copending application of Eugene L. Woodcock, Serial No. 287,563, filed May 13, 1952, for Video Integrator Circuits. That application claims the specific integrator circuits.

The voltage of Fig. 3 may then be passed through a band pass filter centered about the frequency $\omega$. This detecting and filtering will greatly improve the signal-to-noise ratio because of the summing or integration action of the filters. This is possible because use is being made of the known fact that the return from a target persists for a time corresponding to that required for a radar to scan approximately a beamwidth whereas the occurrence of noise is a random time function. Thus a different frequency disposition exists for the two phenomena and permits an enhancement of the signal relative to receiver noise by means of integration.

Fig. 4 illustrates a block diagram of an embodiment of the invention. The transmitter 10 transmits pulses in response to the synchronizer 11. Target echoes are received by radar receiver 12 which provides a video output on lead 13. The output of receiver 12 is connected to parallel detectors 14 and 15 which are preferably of the type which sample and store a voltage proportional to the peak value of the voltage input during the intervals of the applied gating pulses. The outputs of the detectors 14 and 15 are connected to the low-pass filters 21 and 22. A number of detectors may be provided in parallel as will be more fully discussed. The output of each detector is a voltage like that of the waveform of Figure 2 and the output of the filters 21 and 22 are waveforms as in Figure 3.

The detectors are arranged to sample particular range segments as follows. A trigger pulse is derived from synchronizer 11 through delay circuit 30 and applied to gate generator 31. The function of the gate generator is to switch or gate on the detector 14 at a certain time corresponding to a certain range after the transmitted pulse. The trigger from synchronizer 11 is further delayed in delay circuit 32, the output of which is utilized to energize gate generator 33 which switches on detector 15 at a second range. By introducing successive delays, a number of detectors may be switched on at predetermined ranges. The outputs in the filters 21 and 22 may be connected, but not necessarily, to the band pass filter 40 which is centered about the frequency $\omega$. The low pass filter or the combination of the low pass filters and the band pass filter extract the modulation of the target return due to the antenna scanning. The output of the low pass filters 21 and 22 or the band pass filter 40 may be supplied to a suitable indicator 41, or an automatic detection or control device.

A block diagram of a gated video integrator system is shown in Fig. 5. The automatically gain-controlled system video signals on input lead 41′ from the receiver are amplified in a two-stage video amplifier 42, 42′ and the positive video output then goes through a cathode-follower 43 which provides a low impedance source of integrator video on lead 44 to drive the several integrators 45a, 45b, etc. in parallel. The integrators 45 are normally inoperative due to a common cut-off bias on lead 46. They will be gated on in succession by a negative trigger pulse obtained from a lumped constant delay line 48. The pulse is tapped off at short intervals down the line and acts as a trigger to initiate the range gating action in each integrator as it passes down the line.

The negative trigger on lead 47 is derived from a range signal input 49 and is made variable in time with respect to the radar transmitted pulse by multivibrator 51. Its trailing edge is differentiated and inverted in the inverter amplifier 52, and fires the blocking oscillator 54 through the trigger amplifier 53. The negative trigger on lead 47 is taken from the blocking oscillator 54.

The blocking oscillator 54 is also the source of a small positive trigger on lead 58 which is amplified in the trigger amplifier 59 to fire the cathode-coupled monostable range gate multivibrator 60. The range gate is terminated by the delayed negative trigger on lead 61 from the end of the delay line 48. The range gate multivibrator output goes through a cathode follower 62, and the resultant range gate on lead 63 is fed to the mixer gate circuit 64. The range gate corresponds to the range interval that is being integrated.

The artificial video output on lead 65 is composed of the combined outputs from all the integrators 45a—45d. Its derivation will be discussed in connection with Figs. 6a and 6b. The amplitude of the short artificial video pulse from any one integrator will be proportional to the filtered envelope of the integrator video gated into the detector of that particular integrator. The operation of the circuit in the integrator will be described in greater detail later, in connection with Fig. 6. The artificial video comprises locally generated pulses superimposed on the waveform Fig. 3 to reconstruct the video of Fig. 1 without the noise.

The integrator outputs are held nearly cut-off by a positive bias applied by the level setting cathode follower 67. This level is preferably set such that a small predetermined portion of the aritficial video is present on lead 65 with zero integrator video input on lead 44. This level will become somewhat higher when normal noise amplitudes appear on the integrator video lead.

The base of the artificial video signal on lead 65 is removed in a base clipping circuit 68 to eliminate the small predetermined portion that is normally conducted, plus a function "K" of the average noise level. Therefore signals below a certain threshold are rejected. The value of "K" may be set greater or less than unity. The integrator video on lead 44 is also fed to a threshold level set circuit 69 where it is detected and filtered in a long time constant network to provide a direct threshold voltage on lead 71 proportional to the root mean square noise voltage, the exact ratio "K" of the two being controllable by the clip level control 70. The voltage level will vary with the noise level and clip proportionately more or less from the base of the artificial video on lead 65.

The clipped artificial video is passed through a gain control circuit 72 where it is attenuated to approximately the level of the system video on lead 41'. The system video on lead 41' is gated off in gate 64 by the range gate voltage on lead 63 during the range interval processed by the integrators. The artificial video from gain control 72 and noisy system video on lead 41' are mixed in mixing amplifier 73 to provide a complete presentation on the indicator 77. If the useful output goes to an automatic control circuit it would not be necessary to reinsert the system video on lead 41'. It is only reinserted to provide a complete radar indication on indicator 77 for the convenience of a human operator. Therefore, an A type indicator will show the normal noisy system video signal except during the integrated portion. The base clipped artificial video is normally zero except during the range gate voltage on lead 63. A gate level control 74 is provided to permit varying the base level of the artificial portion of the video with respect to the system video when the two are mixed. The negative signals in the common plate circuit are inverted in the inverter 75 and fed as mixed system video and artificial video to the indicator 77 or some automatic detection or control device through a cathode follower 76.

The integrator

Figure 6B:
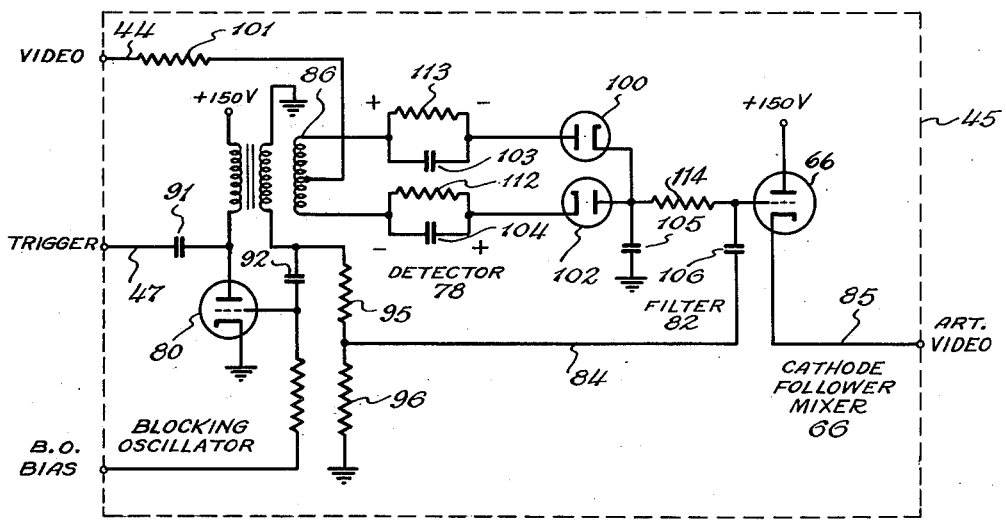

Operation of the individual integrator in detecting and filtering the video from its assigned range increment may be understood from the block and schematic diagrams of the integrator Figs. 6a and 6b. Specific integrator circuits are disclosed and claimed in the above-mentioned Woodcock application. In the block diagram Fig. 6a, the integrator video on lead 44 is fed into a gated detector 78. This detector is preferably of the switched bi-directional bridge type. The detector is turned on for an increment of time approximately equal to the radar pulse width by the detector gate on lead 79 and will detect or sample the instantaneous value of the video on lead 44 during that time.

The blocking oscillator 80 provides the necessary gate voltage on lead 79 to the detector 78 when the delayed negative trigger on lead 47 arrives causing it to fire. The blocking oscillator 80 is normally held cut-off by a bias on lead 46 common to all the integrators. The delayed negative trigger on lead 47 is tapped from the delay line as mentioned above, and will be delayed from the trigger sent to the previous integrator in the chain, as shown in Fig. 5.

The amplitude of the detected video from detector 78 will vary in steps, as in Fig. 2, each step occurring at the time the detector 78 is gated. The steps are spaced in time by the pulse repetition interval. Detected noise would appear at this point as steps of randomly varying amplitude occurring about some average voltage level indicative of the noise level at the input. Detected signals-plus-noise will have a similar appearance, but a higher average voltage level due to repeated returns from the target which do not vary in random fashion.

The random steps of the detected video output from detector 78 are attenuated in a low pass filter 82. The filter 82 output at any instant of time represents a weighted average of the detected video pulses which had been applied to the integrator in a period of time immediately past which is comparable to the time required to scan a beamwidth. This low pass band greatly attenuates the rapid, random fluctuations due to detected noise, but does not seriously reduce the slower variations in level due to detection of a group of repeated signals such as returns from a target passing through the radar beam. The resultant slowly varying filter 82 output Fig. 3 acts as a base potential for the grid of the cathode follower 66.

The filter 82 output may be phase shifted somewhat but this would not affect system operation.

Superimposed on the filter 82 output, Fig. 3, are positive pulses from the blocking oscillator, namely the artificial video pulses on lead 84. These pulses are of such amplitude that with zero volts out of the filter 82 the bias of the cathode follower 66 due to a positive potential at its cathode will be just overcome, permitting the cathode follower to conduct, putting low amplitude voltage pulses on the output lead 85. Essentially the artificial video pulses on lead 84 are being modulated at the grid of the cathode follower 66 by the slowly varying filter 82 output. The cathode follower outputs of all the parallel integrators of Fig. 5 are combined to form the complete system artificial video pulse signals.

The schematic diagram, Fig. 6b, shows a typical integrator circuit 45. The blocking oscillator tube 80 is plate triggered through condenser 91 by the negative trigger on lead 47 tapped off the delay line 48, Fig. 5. Positive feedback to the grid is accomplished through condenser 92. The artificial video on lead 84 is taken from a voltage divider composed of resistors 95 and 96 across the grid winding of the blocking oscillator transformer. The detector gate 78 is magnetically coupled into a tertiary winding 86 on the blocking oscillator transformer.

The integrator video on lead 44 is coupled through isolating resistor 101 to the center tap of the blocking oscillator transformer tertiary 86 in the gated detector. When the detector gate pulses occurs, a positive voltage is induced on the upper end of the tertiary winding 86 and an equal and opposite negative voltage is induced on the opposite end. This permits both diodes 100 and 102 to conduct, placing a low impedance charge path for the video between condenser 105 and the integrator video signal input 44. The time constants are such that condenser 105 will almost completely charge proportional to the video during the sampling gate. Current flowing through the diodes due to the voltage induced between the ends of the transformer tertiary 86 will charge condensers 103 and 104. At the end of the gate pulses, condenser 104 discharges through resistor 112 and condenser 103 through resistor 113. The discharge currents through resistors 112 and 113 will create bias potentials of the polarity shown, keeping the diodes cut off until the next detector gate on lead 78 is generated.

The $\pi$ section filter 82 is composed of condenser 105 and 106 and resistor 114. Capacitor 105 serves a double function as the load impedance to the gated detector, and input capacitor to the filter. Since condenser 105 is not isolated from resistor 114 and condenser 106, it is free to discharge through resistor 114 into condenser 106 in the pulse repetition interval. When the output from the filter is of interest only at the time the detector gate on lead 86 occurs, as is the case in this application, the filter may be designed to have integrating action equivalent to that of an isolated L-section filter.

The artificial video pulses on lead 84 are coupled to the grid of the cathode follower mixer 66 through capacitor 106, the filter output capacitor. The source impedance of the pulses is low enough so the integrating action of the filter is not disturbed. Integrators of the above type are disclosed in detail and claimed in co-pending application Serial No. 287,563 filed May 13, 1952 entitled Video Integrator Circuits in the name of Eugene L. Woodcock.

Therefore, the gated video system of the present invention provides means for splitting a specified segment of range into small increments or channels; means for detecting and filtering the video signal from each increment in its own individual detector-integrator, means for generating in each integrator an artificial video signal which is proportional to the filtered video gated to that unit, and finally means for combining the artificial video outputs from the several integrators to form an artificial video signal for the segment of range thus processed. By suitable design of detector and filter in the individual integrators, it is possible to reduce the output due to random noise to a very low level, while the output due to a received target, which will be repetitious for a certain interval, should be only slightly reduced. Optimum filtering is obtained when the time constant of the low pass filter 82 (Fig. 6a) is approximately equal to the time required for the radar to scan one beamwidth.

In a particular embodiment, it was found desirable to integrate a segment of range 5000 to 8000 yards long, with each increment being about 200 yards in length. The lengths of the range segment and the short increments will depend on the tactical use of the radar and its pulse length. Allowing for some overlap of the increments, from 30 to 50 separate integrators should suffice for this application.

The gated video integrator of Fig. 5 may be inserted in the system video lead between the radar receiver and the radar indicator or some automatic detection device. Inputs will consist of the video from the radar receiver (which would normally go to the indicator), a range signal to determine the start of the segment of range to be integrated (this can and should be variable in range), and finally a supply of primary power. The output will be a mixed video signal composed of the artificial video for a given segment of range, and normal video for the remainder of the range. The artificial video segment is then adjustable at will to any portion of the range sweep.

In some applications where interest is limited to the range increment which is processed by the integrators, those parts of the system of Fig. 5 required to combine the artificial and noisy system video may be deleted. Such application would be in the field of automatic acquisition, or control. The integrator system may be used most advantageously at extended ranges, i. e., areas of fringe reception, to pick up targets out of the noise. Therefore, the present invention may be utilized to extend the range of conventional search radars, which is an important feature in view of the increasing speed of aircraft.

Since many changes could be made in the above construction and many apparently widely different embodiments of this invention could be made without departure from the scope thereof, it is intended that all matter contained in the above description or shown in the accompanying drawings shall be interpreted as illustrative and not in a limiting sense.

What is claimed is:

1. A gated video integrator radar system comprising a pulsed transmitter, a receiver responsive to reflections of energy from said transmitter, a scanning antenna, means for integrating signals from small increments of range comprising a plurality of peak voltage responsive sampling detectors connected in parallel to said receiver, timing means connected to said transmitter and adapted to gate on said detectors once each pulse recurrence interval of said pulse transmitter for instants corresponding to predetermined ranges, low pass filter means connected to the output of each one of said detectors, combining means coupled to the outputs of said filter means and to said timing means, and signal threshold means connected to the output of said combining means for rejecting signals below a certain level.

2. In a radar system having transmitter and scanning antenna, a receiver for receiving reflected signals amplitude modulated at the frequency of said scanning, means connected to said receiver to detect said amplitude modulation comprising peak responsive detector means and low pass filter means connected in series, and local pulse generator means producing recurrent pulses synchronized with and delayed from the output pulses from said transmitter connected to the output of said filter means to superimpose artificial video pulses on said filter output.

3. In a radar system having transmitter and scanning antenna, a receiver for receiving reflected signals amplitude modulated at the frequency of said scanning, means connected to said receiver to detect said amplitude modulated signals comprising peak responsive detector means and low pass filter means connected in series, local pulse generator means producing recurrent pulses synchronized with and delayed from the output pulses from said transmitter connected to the output of said filer means to superimpose artificial video pulses on said filter output, and signal threshold responsive means connected to said filter means to reject signals below a certain level.

4. In a radar system having transmitter and scanning antenna, a receiver for receiving reflected signals amplitude modulated at the frequency of said scanning, means connected to said receiver to detect said amplitude modulation comprising peak responsive detector means and low pass filter means connected in series, local pulse generator means connected to the output of said filter means to superimpose artificial video pulses on said filter output, signal threshold responsive means connected to said filter means to reject signals below a certain level, and control means to vary said signal threshold responsive means in accordance with the level of said signals.

5. A gated video integrator radar system comprising a pulse transmitted, a receiver for receiving reflected signals, a scanning antenna connected to said transmitter and said receiver, a plurality of signal integrators connected to said receiver, said integrators having time constants substantially equal to the time of scanning one beamwidth, means to gate on said integrators at particular times, signal threshold means connected to said integrators to reject signals below a certain level, and means connected to said integrators to apply locally generated artificial noise free video signals to the output of said integrators.

6. In a radar system including a scanning antenna for radiating recurrent transmitter pulses into space and including means for receiving recurrent pulse signals reflected from an object in space; the combination comprising a gated detector coupled to the output of said receiving means, pulse producing means coupled to said gated detector for recurrently energizing said detector for short instants of time once each pulse recurrence interval, filter means coupled to the output of said gated detector, said filter means having a time constant long in comparison to the pulse recurrence interval for integrating said recurrent reflected pulse signals as the beam of the scanning antenna scans through said object in space, and combining means coupled to the output of said filter means and said pulse producing means for producing artificial output pulse signals representing said received reflected pulse signals.

7. The apparatus as defined in claim 6 further comprising means coupled to the output of said combining means for responding selectively to the artificial output pulse signals therefrom when said filter means is supplying an integrated output voltage to said combining means.

8. The apparatus as defined in claim 6 further comprising threshold responsive means coupled to the output of said combining means for rejecting artificial output pulse signals below a predetermined level.

9. In a radar system including a scanning antenna for radiating recurrent transmitter pulses into space, and including means for receiving recurrent pulse signals reflected from an object in space; the combination comprising a plurality of gated detectors coupled to the output of said receiving means, pulse producing means coupled to each of said gated detectors for sequentially energizing said detectors for short instants of time corresponding to a plurality of different range increments in space from which reflected pulse signals are expected, filter means coupled to the output of each gated detector, each of said filter means having a time constant long compared to the pulse recurrence interval, and means jointly responsive to the output of respective ones of said filter means and said pulse producing means for producing artificial output pulse signals representing received reflected pulse signals.

10. In a radar system including a scanning antenna for radiating recurrent transmitter pulses into space, means for receiving recurrent pulse signals reflected from objects in space, and indicator means connected to said receiving means for indicating the presence of said objects; the combination comprising a plurality of gated detectors coupled to the output of said receiving means, pulse producing means coupled to each of said gated detectors for sequentially energizing said detectors for short instants of time corresponding to a plurality of range increments in space from which reflected pulse signals are expected, low-pass filter means coupled to the output of each gated detector, combining means coupled to the output of said filter means and to said pulse producing means for producing artificial output pulse signals representing received reflected pulse signals, and means selectively disconnecting the received pulse signals supplied to said indicator means from said receiving means during a portion of each pulse recurrence time interval, said portion of each pulse recurrence time interval including the short instants of time corresponding to the plurality of range increments in space from which reflected pulse signals are expected, said last-defined means further selectively connecting the output of said combining means to said indicator means during said portion of each pulse recurrence time interval.

11. In a radar system including a scanning antenna for radiating recurrent pulses of energy and including means for receiving reflected pulses from an object in space; the combination comprising a gate circuit coupled to the output of said receiving means, means coupled to said gate circuit for momentarily energizing said gate circuit once each recurrence interval, low-pass filter means coupled to the output of said gate circuit, said filter means having a time constant long in comparison with the recurrence interval, said gate circuit momentarily coupling the output voltage from said receiving means to said filter means, selective means coupled to the output of said filter means and to said energizing means and being jointly responsive to the output voltage from said filter means and the output from said energizing means, threshold responsive means coupled to the output of said selective means, and means intercoupling the output of said receiving means and said threshold responsive means for producing an output control voltage varying according to the average value of the output signal from said receiving means, said threshold responsive means passing the output voltage from said selective means when its magnitude exceeds the magnitude of said control voltage.

12. The apparatus as defined in claim 11 wherein said means coupled to said gate circuit for momentarily energizing said gate circuit once each recurrence interval comprises a pulse generator means producing output pulses synchronized with and delayed from the recurrent pulses radiated by said scanning antenna.

13. The apparatus as defined in claim 12 wherein said pulse generator means synchronized to the recurrent pulses radiated from said scanning antenna includes controllable time delay means for delaying said output pulses with respect to said recurrent pulses by an amount dependent upon the range of a selected object in space from said scanning antenna.

14. The apparatus as defined in claim 13 further comprising indicator means coupled to the output of said threshold responsive means for indicating the output voltage from said threshold responsive means when the magnitude of said output voltage exceeds the magnitude of said control voltage.

References Cited in the file of this patent

UNITED STATES PATENTS

| | | |
|---|---|---|
| 2,494,339 | Keister | Jan. 10, 1950 |
| 2,517,540 | Busignies | Aug. 8, 1950 |
| 2,557,869 | Gloess | June 19, 1951 |
| 2,577,502 | Bainbridge | Dec. 4, 1951 |